(No Model.)
J. G. HODGSON.
CAP FOR CANS.
No. 434,868. Patented Aug. 19, 1890.
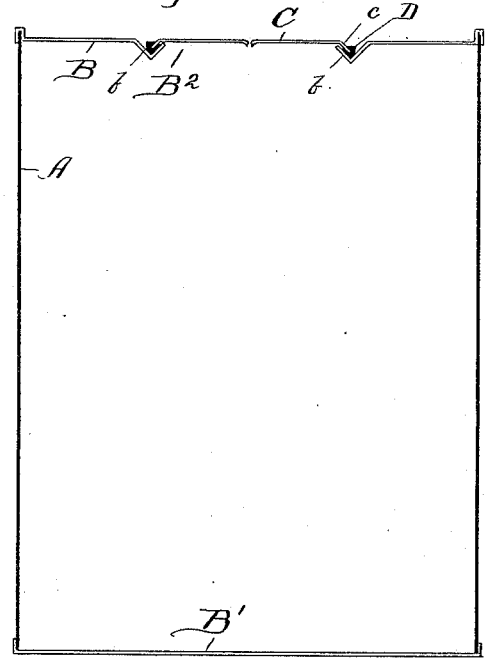
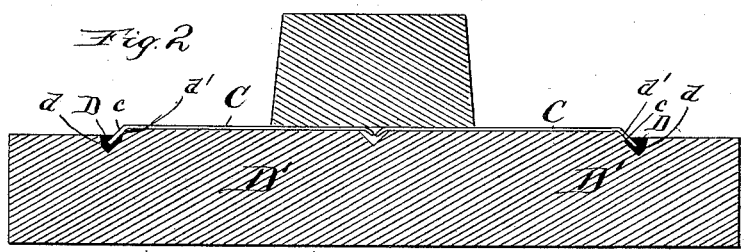
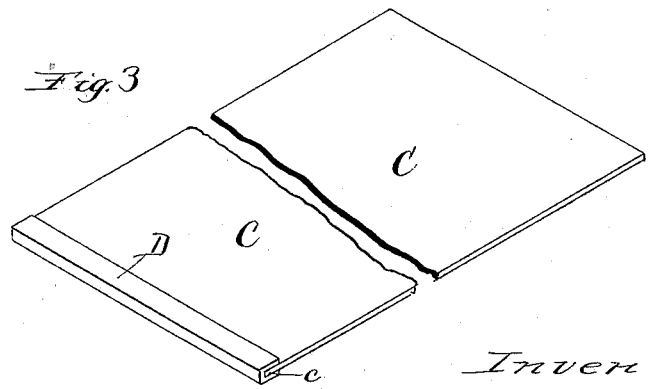
Witnesses:
Geo. E. Curtis.
H. M. Munday.
Inventor:
John G. Hodgson
By Munday, Evarts & Adcock
His Attorneys.

UNITED STATES PATENT OFFICE.

JOHN G. HODGSON, OF MAYWOOD, ILLINOIS.

CAP FOR CANS.

SPECIFICATION forming part of Letters Patent No. 434,868, dated August 19, 1890.

Application filed February 3, 1890. Serial No. 339,043. (No model.)

*To all whom it may concern:*

Be it known that I, JOHN G. HODGSON, a citizen of the United States, residing in Maywood, in the county of Cook and State of Illinois, have invented a new and useful Improvement in Caps for Cans, of which the following is a specification.

My invention relates to caps used for closing the stud holes or openings in the heads of sheet-metal cans.

It consists in casting an annulus of solder upon the rim of the tin-plate can-cap and securing it in place by fusibly uniting the solder with the tin coating of the tin-plate.

In the accompanying drawings, which form a part of this specification, and in which similar letters of reference indicate like parts, Figure 1 is a central section of a can embodying my invention. Fig. 2 shows a mold which may be used in casting and fusing the solder on the can-cap. Fig. 3 illustrates the application of the invention to other tin-plate blanks than can-caps.

In the drawings, A represents the can having heads B and B' made of tin-plate. B² is the stud hole or opening, and *b* the cap groove surrounding such opening.

C is the can-cap, having a rim *c* of the usual form. The rim *c* of the can-cap is provided with an annulus of solder D, which is cast upon the rim of the can-cap and fusibly united with or soldered to the tin coating of the tin-plate.

D' represents a mold, which may be used in casting the solder annulus upon the cap C. It has an annular groove *d*, in which the rim of the can-cap fits. The groove *d* has a shoulder *d'*, upon which the cap rests, and which limits the portion of the rim to be covered by the solder annulus. The groove *d* is made to hold just the quantity of solder required to solder the cap to the can and properly form the joint. By thus casting and fusibly uniting the solder annulus on the cap the rim of the cap is protected, and the solder annulus is formed in cross-section to fit in the cap groove of the can.

As shown in Fig. 3, the invention is applied to a tin-plate blank of a rectangular form. It should be observed that this rim *c* or edge of the plate is properly fluxed before being placed in the molten solder to which it is to be fused or united. As soon as the solder sets or cools the cap may be removed from the mold.

I claim—

1. A tin-plate can-cap having its outside rim or edge furnished with an annulus or coating of solder cast thereon and fusibly united with the tin coating of the plate, said solder annulus being of sufficient thickness to afford the necessary amount of solder for soldering the can-cap in place, substantially as specified.

2. A tin-plate blank having its outside rim or edge furnished with solder cast thereon and fusibly united with the tin coating of the plate in sufficient quantity for soldering a joint, substantially as specified.

JOHN G. HODGSON.

Witnesses:
EDMUND ADCOCK,
H. M. MUNDAY.